United States Patent
Shimada et al.

(10) Patent No.: US 11,709,337 B2
(45) Date of Patent: Jul. 25, 2023

(54) OPTICAL ARTICLE

(71) Applicant: HOYA LENS THAILAND LTD., Pathumthani (TH)

(72) Inventors: Takuya Shimada, Tokyo (JP); Yusuke Kutsukake, Tokyo (JP); Terufumi Hamamoto, Tokyo (JP); Teruo Yamashita, Tokyo (JP); Tsuyoshi Watanabe, Tokyo (JP)

(73) Assignee: HOYA LENS THAILAND LTD., Pathumthani (TH)

(*) Notice: Subject to any disclaimer, the term of this patent is extended or adjusted under 35 U.S.C. 154(b) by 644 days.

(21) Appl. No.: 16/728,311

(22) Filed: Dec. 27, 2019

(65) Prior Publication Data

US 2020/0142221 A1 May 7, 2020

Related U.S. Application Data

(63) Continuation of application No. PCT/JP2019/014326, filed on Mar. 29, 2019.

(51) Int. Cl.
*G02C 7/10* (2006.01)
*G02B 1/14* (2015.01)
*G02B 7/10* (2021.01)
*G02B 5/23* (2006.01)

(52) U.S. Cl.
CPC .............. *G02B 7/10* (2013.01); *G02B 1/14* (2015.01); *G02B 5/23* (2013.01); *G02C 7/102* (2013.01)

(58) Field of Classification Search
None
See application file for complete search history.

(56) References Cited

U.S. PATENT DOCUMENTS

RE46,357 E * 4/2017 Asai .................... C09K 9/02
9,977,161 B2    5/2018 Momoda et al.
(Continued)

FOREIGN PATENT DOCUMENTS

| CN | 1533413 A | 9/2004 |
| EP | 2040099 A1 | 3/2009 |
| EP | 3136138 A1 | 3/2017 |

(Continued)

OTHER PUBLICATIONS

PCT/JP2019/014326, English translation of International Search Report, 1 page.

(Continued)

*Primary Examiner* — Darryl J Collins
*Assistant Examiner* — Tamara Y. Washington
(74) *Attorney, Agent, or Firm* — Kilpatrick Townsend & Stockton LLP

(57) ABSTRACT

An optical article, such as a spectacle lens, includes, on a substrate, a photochromic layer containing a photochromic dye and a resin component, and a protective film. The indentation hardness of the photochromic layer in the thickness direction is less than or equal to the indentation hardness of the surface of the substrate. The result of multiplying the indentation hardness of the protective film in the thickness direction and the thickness of the protective film is five-hundredths or more times and one or less times the result of multiplying the indentation hardness of the photochromic layer in the thickness direction and the thickness of the photochromic layer.

20 Claims, 2 Drawing Sheets

(56) References Cited

U.S. PATENT DOCUMENTS

2007/0209393 A1    9/2007   Miller et al.
2010/0209603 A1    8/2010   Hasegawa et al.

FOREIGN PATENT DOCUMENTS

| JP | 2008-58932 A | 3/2008 | |
|---|---|---|---|
| JP | 2010-524726 A | 7/2010 | |
| WO | 03/011967 A1 | 2/2003 | |
| WO | WO-2017146171 A1 * | 8/2017 | ............... C08K 5/56 |

OTHER PUBLICATIONS

CN201980004760.0, "Office Action", dated Dec. 4, 2020, 6 pages.
EP3779571, "Cover Page and Search Report", dated Feb. 17, 2021, 4 pages.
EP19778071.1, "Extended European Search Report", dated Dec. 13, 2021, 9 pages.
JP2020-509350, "Notice of Reasons for Refusal with Machine Translation", dated Apr. 27, 2021, 6 pages.
Mazur et al., "$TiO_2/SiO_2$ multilayer as an antireflective and protective coating deposited by microwave assisted magnetron sputtering", Opto-Electronics Review 21(2), Mar. 15, 2013, 233-238.

\* cited by examiner

OPTICAL ARTICLE

CROSS REFERENCE TO RELATED APPLICATIONS

This application is a continuation of International Application No. PCT/JP2019/014326 filed Mar. 29, 2019, which claims priority to Japanese Patent Application No. 2018-068998 filed on Mar. 30, 2018, and the contents of which is incorporated by reference in its entirety.

TECHNICAL FIELD

The present disclosure relates to an optical article, such as a spectacle lens including a photochromic layer having photochromism.

BACKGROUND ART

Recent plastic spectacle lenses use photochromism of organic photochromic dyes. This technique uses a reversible color change of organic photochromic dyes. Specifically, organic photochromic dyes develop color in response to light including ultraviolet rays, such as sunlight, in bright outdoor environments and return their original color (colorless state) in the absence of ultraviolet rays, for example, in indoor environments to recover high transmittance. This color change is called photochromism. The photochromism can reduce the glare of sunlight.

Examples of the method for producing a spectacle lens having photochromism include a method of forming a photochromic film containing a photochromic compound on a lens surface by coating, a method of impregnating a non-photochromic lens surface with a photochromic compound, and a method of producing a photochromic lens directly by dissolving a photochromic compound in a lens monomer and polymerizing the lens monomer. In particular, a method of forming a photochromic film on a lens surface by coating, that is, a coating method, is an effective means because this method can be applied to various existing plastic lenses (e.g., see Patent Literature 1).

CITATION LIST

Patent Literature

Patent Literature 1: WO 2003/011967 A
Patent Literature 2: JP 2008-58932 A
Patent Literature 3: WO 2008/001578 A

SUMMARY OF DISCLOSURE

Technical Problem

It may be desired for a photochromic film to develop color with high density in quick response to predetermined light when exposed to the light and readily fade when placed in an environment without predetermined light. In the related art, the coloring or fading reaction rate and color density of a photochromic film have been considered to depend on the intrinsic properties of photochromic dyes attributed to their molecular structure. Thus, studies have been carried out to improve the responsivity (reaction rate and color density) of a photochromic film to light by using a photochromic dye having a particular molecular structure.

However, the responsivity (reaction rate and color density) of a conventional photochromic film to light is not satisfactory, and it is desired to further improve optical responsivity.

Patent Literature 2 discloses that the coloring or fading reaction rate and color density are greatly improved when a photochromic film is not completely cured and has flexibility (fluidity) so that the dye easily moves in the film. Patent Literature 2 also discloses that the optical responsivity of a photochromic lens is exhibited mainly from an object-side (light entrance surface-side) surface layer through which light enters, and high optical responsivity is obtained when at least the dye present in the object-side surface layer of the photochromic lens easily moves.

Patent Literature 3 discloses that the optical responsivity is improved by lowering the surface hardness of a photochromic film.

However, the methods disclosed in Patent Literature 2 and Patent Literature 3 can improve optical responsivity by making the photochromic film soft, but fail to provide sufficient film strength because of the photochromic film having low hardness, which causes problems of low scratch resistance and low adhesion. In other words, existing techniques fail to achieve both high optical responsivity of the photochromic film and high lens strength at the same time.

In light of such problems, the present disclosure is directed to an optical article represented by, for example, a spectacle lens that has high strength and in which a photochromic layer having photochromism has high optical responsivity (particularly high fading rate).

Solution to Problem

The inventors of the present disclosure have intensively studied to solve the foregoing problems. There is a limit in improving optical responsivity by improving the composition of a photochromic film (photochromic layer) or the like. To further improve the optical responsivity of the photochromic layer, it may be desired for the photochromic layer to be soft such that a dye in the layer easily moves. It is found that, to ensure high lens strength and improve the optical responsivity, especially fading rate, of the photochromic layer, it may be desired for the three-dimensional hardness of the photochromic layer to be defined by using an index called three-dimensional hardness in consideration of the thickness of the layer. It is also found that, when a protective film, such as a hard coat film or an anti-reflection film, is disposed on such a soft photochromic layer, the photochromic layer and the protective film together can ensure high strength, and in this case, it may be desired for the three-dimensional hardness ratio between the photochromic layer and the protective film to be in a predetermined range in order to obtain high lens strength and improve the optical responsivity, particularly fading rate, of the photochromic layer.

The present disclosure has been completed on the basis of the above finding. Specifically, the present disclosure has the following aspects which may be applied to solve the foregoing problems.

(First Aspect)

An optical article includes, on a substrate, a photochromic layer containing a photochromic dye and a resin component and a protective film. An indentation hardness of the photochromic layer in a thickness direction is less than or equal to an indentation hardness of a surface of the substrate. A value defined by an indentation hardness of the protective film in a thickness direction × a thickness of the protective film is 0.05 or more times and 1 or less times a value defined by the indentation hardness of the photochromic layer in the thickness direction × a thickness of the photochromic layer.

(Second Aspect)

In the optical article according to the first aspect, the value defined by the indentation hardness of the photochromic layer in the thickness direction × the thickness of the photochromic layer is in a range of from 0.5 to 3200 mgf/μm.

(Third Aspect)

In the optical article according to the first or second aspect, the indentation hardness of the photochromic layer in the thickness direction is in a range of from 0.1 to 40 mgf/μm$^2$.

(Fourth Aspect)

In the optical article according to any one of the first to third aspects, the thickness of the photochromic layer is in a range of from 5 μm to 80 μm.

(Fifth Aspect)

In the optical article according to any one of the first to fourth aspects, the protective film includes a hard coat film and/or an anti-reflection film.

(Sixth Aspect)

In the optical article according to any one of the first to fifth aspects, the indentation hardness of the protective film in the thickness direction is in a range of from 10 to 200 mgf/μm$^2$.

(Seventh Aspect)

In the optical article according to any one of the first to sixth aspects, the thickness of the protective film is in a range of from 0.5 μm to 10 μm.

(Eighth Aspect)

In the optical article according to any one of the first to seventh aspects, the resin component in the photochromic layer includes an uncured curable component and a cured resin formed by curing an ultraviolet curable component.

(Ninth Aspect)

In the optical article according to the eighth aspect, the curable component includes a high hardness monomer and a low hardness monomer.

(Tenth Aspect)

In the optical article according to any one of the first to ninth aspects, the optical article is a spectacle lens with power or a spectacle lens without power.

(Eleventh Aspect)

In the optical article according to any one of the first to ninth aspects, the optical article is a goggle lens.

(Twelfth Aspect)

In the optical article according to any one of the first to ninth aspects, the optical article is a visor (brim) portion of a sun visor.

(Thirteenth Aspect)

In the optical article according to any one of the first to ninth aspects, the optical article is a shield member of a helmet.

Advantageous Effects of Disclosure

According to the present disclosure, an optical article represented by, for example, a spectacle lens that has high strength and in which a photochromic layer having photochromism has high optical responsivity (particularly high fading rate) can be provided.

DESCRIPTION OF EMBODIMENT

Hereinafter, an embodiment of the present disclosure will be described in detail with reference to the drawings. The following embodiment mainly focuses on application of the present disclosure to the structure of a spectacle lens (with power, without power), which is a typical example of an optical article according to the present disclosure.

Figure 1:
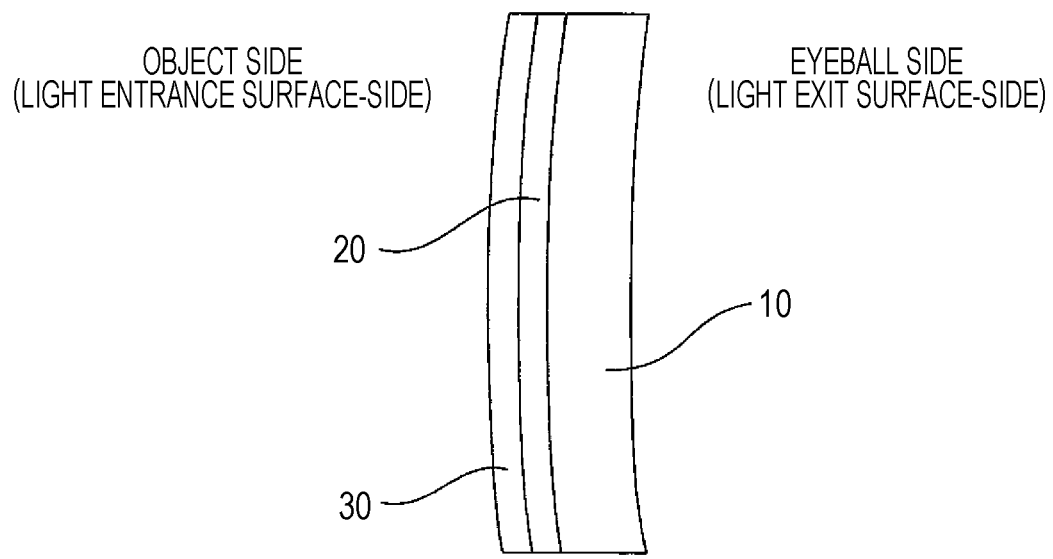
FIG. 1 is a cross-sectional view showing an embodiment of a spectacle lens according to the present disclosure.

FIG. 1 is a cross-sectional view showing an embodiment of a spectacle lens according to the present disclosure.

A spectacle lens shown in FIG. 1 has a structure in which at least a photochromic layer 20 containing a photochromic dye and a resin component and a protective film 30 are stacked in this order on a lens substrate 10. The protective film 30 includes, for example, a hard coat film or an anti-reflection film. In this specification, the spectacle lens according to the present disclosure may also be referred to as a "photochromic lens".

The spectacle lens according to the present disclosure can be produced, for example, in the following manner, but the production method should not be limited to the following production method.

First, a photochromic layer coating liquid containing at least a photochromic dye and a photocurable component is applied onto one surface of the lens substrate 10 by means of spin coating or the like to form a photochromic layer coating film. Next, the photochromic layer coating film is irradiated with light through at least the lens substrate, that is, from the lens substrate side, to cure at least part of the photocurable component, forming the photochromic layer 20 having predetermined hardness.

Next, a hard coat film is formed on the surface of the photochromic layer 20 formed on the lens substrate 10 by means of spin coating or the like, and an anti-reflection film is formed on the hard coat film by means of sputtering or the like. As a result, the protective film 30 including the hard coat film and the anti-reflection film is formed on the photochromic layer 20.

The components of the photochromic layer coating liquid will be described below in detail.

As described in the disclosure according to the first aspect, the spectacle lens according to the present disclosure is a spectacle lens including, on a lens substrate, a photochromic layer containing a photochromic dye and a resin component and a protective film. An indentation hardness of the photochromic layer in a thickness direction is less than or equal to an indentation hardness of a surface of the lens substrate. A value defined by an indentation hardness of the protective film in a thickness direction × a thickness of the protective film is 0.05 or more times and 1 or less times a value defined by the indentation hardness of the photochromic layer in the thickness direction × a thickness of the photochromic layer.

The term indentation hardness as used herein refers to a value obtained from a displacement-load curve from loading to unloading of a measurement indenter. The indentation hardness is specified in ISO 14577.

Next, a method for measuring indentation hardness in the present disclosure will be described with reference to FIG. 2, FIG. 3, and FIG. 4.

Figure 2:
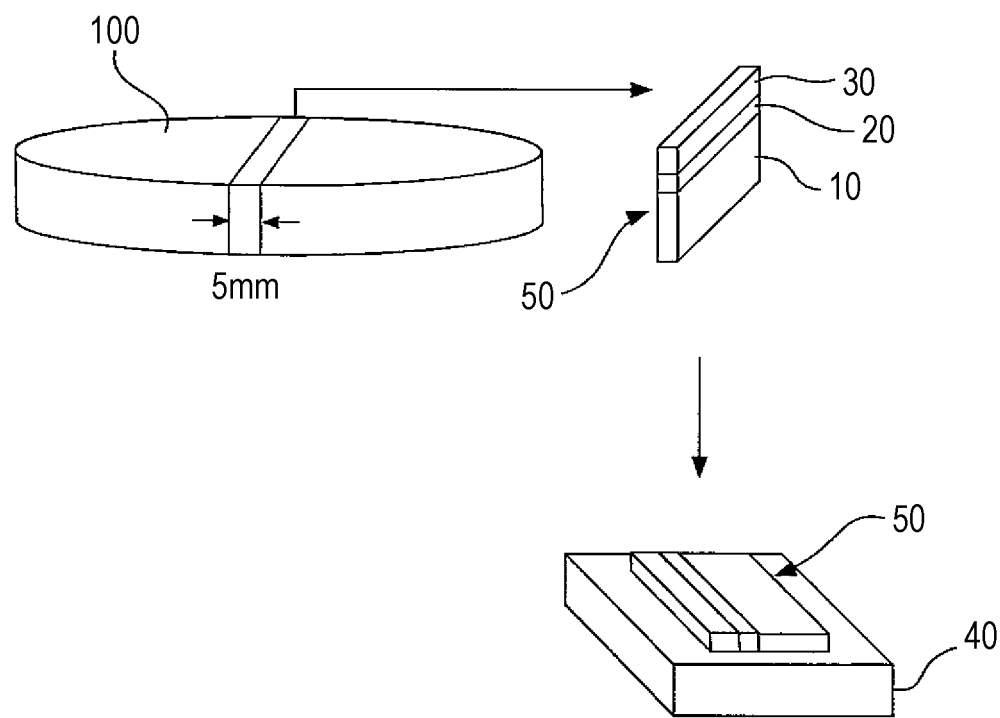
FIG. 2 is a schematic view for describing a method for measuring indentation hardness in the present disclosure.
Figure 3:
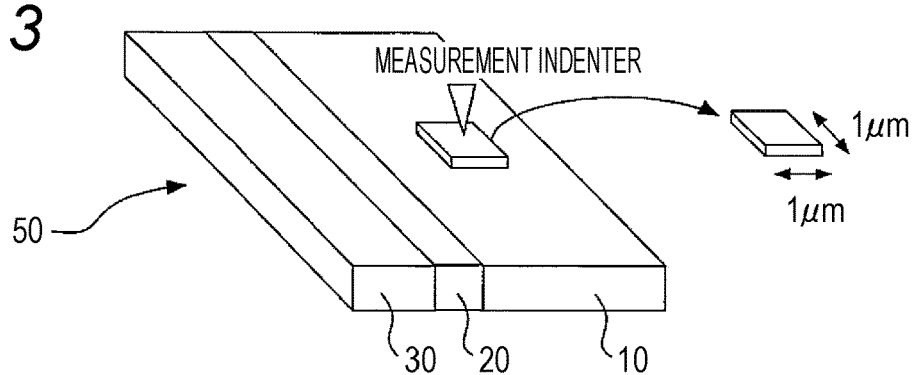
FIG. 3 is a schematic view for describing the method for measuring indentation hardness in the present disclosure.
Figure 4:
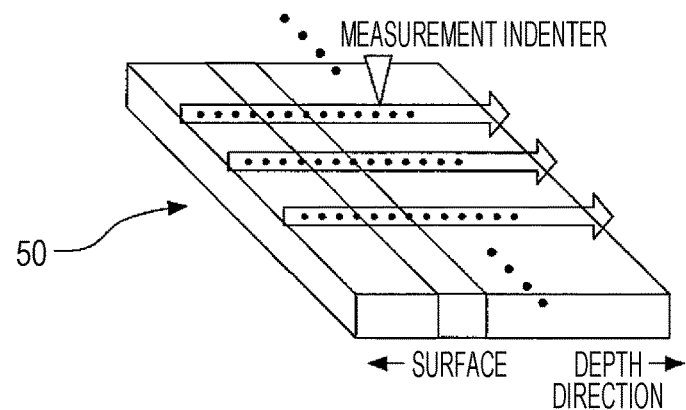
FIG. 4 is a schematic view for describing the method for measuring indentation hardness in the present disclosure.

FIG. 2, FIG. 3, and FIG. 4 are schematic views for describing the method for measuring indentation hardness in the present disclosure.

1. Test Sample Preparation

A photochromic lens (spectacle lens) 100 shown in FIG. 2 has a structure in which a photochromic layer 20 and a protective film 30 are stacked in this order on a lens substrate 10. An actual photochromic lens has a convex upper surface, but the photochromic lens here is schematically illustrated.

As shown in FIG. 2, the photochromic lens 100 is sliced into a thickness of 5 mm by using a slicing jig, and the slice surfaces are processed into flat surfaces as necessary to produce a test sample 50. The test sample 50 thus produced shows the cross section of the lens, that is, the structure including the photochromic layer 20 and the protective film 30 on the lens substrate 10. The test sample 50 is attached and fixed onto a sample stage 40 by using an adhesive or the like such that the cross section faces upward.

2. Sample Cross-Section Observation

The thickness of each layer (film) along the cross section of the test sample 50 is measured with, for example, a scanning electron microscope (SEM) or a transmission electron microscope (TEM). The measuring means used is not necessarily limited to these SEM and TEM. The photochromic layer, the protective layer, and the interface between these layers are determined by checking colored regions by means of irradiation with a commercial UV light during cross-sectional observation. The layer between the interface and the lens substrate is defined as the photochromic layer, and the layer on the surface side from the interface is defined as the protective layer.

3. Hardness Measurement

The indentation hardness of each layer of the test sample 50 in the thickness direction (depth direction) is measured.

In the present disclosure, the indentation depth h (nm) against the indentation load P (mgf) is continuously measured throughout the entire process from loading start to unloading at measurement positions by using nano-indentation hardness tester ENT-2100 available from ELIONIX INC, and the P-h curve is obtained. The indentation hardness H can be calculated from the obtained P-h curve in accordance with the following formula.

$$H(mgf/\mu m^2) = P\,max/A$$

(wherein Pmax: maximum load (mgf), A: indenter projected area ($\mu m^2$))

The indentation hardness measured as described above refers to a hardness (hardness) per unit area ($\mu m^2$) at a measurement position (measurement point) in the thickness direction (depth direction) (see FIG. 3). In this specification, the indentation hardness per unit area ($\mu m^2$) measured in the thickness direction (cross-sectional direction) is also referred to as "cross-section hardness" for convenience of description.

Regarding measurement positions (measurement points), as shown in FIG. 4, the lens surface is set to "0 (zero)", and the direction from zero toward the lens substrate is defined as the depth direction in the present disclosure. The indentation hardness, that is, cross-section hardness, is measured at measurement points at 5 μm intervals from the lens surface side or the lens substrate side by the hardness measurement method described above. The number of measurement points is more than or equal to the number of layers. The same measurement is performed at 20 different points, and four highest values and four lowest values are excluded from the data obtained at 20 points, and the mean indentation hardness at each depth is calculated from the data at the remaining 12 points.

4. Cross-Section Hardness Profile Creation

The cross-section hardness profile is obtained by plotting the mean cross-section hardness calculated as described above against depth (distance from edge (lens surface)). The cross-section hardness profile is compared with the thickness data measured in section 2 described above, and each plot point is correlated with the corresponding layer from the lens substrate side. In this case, layers that cannot be correlated with the corresponding layer because they are too thin (less than 5 μm) to obtain measurement points are excluded.

Figure 5:
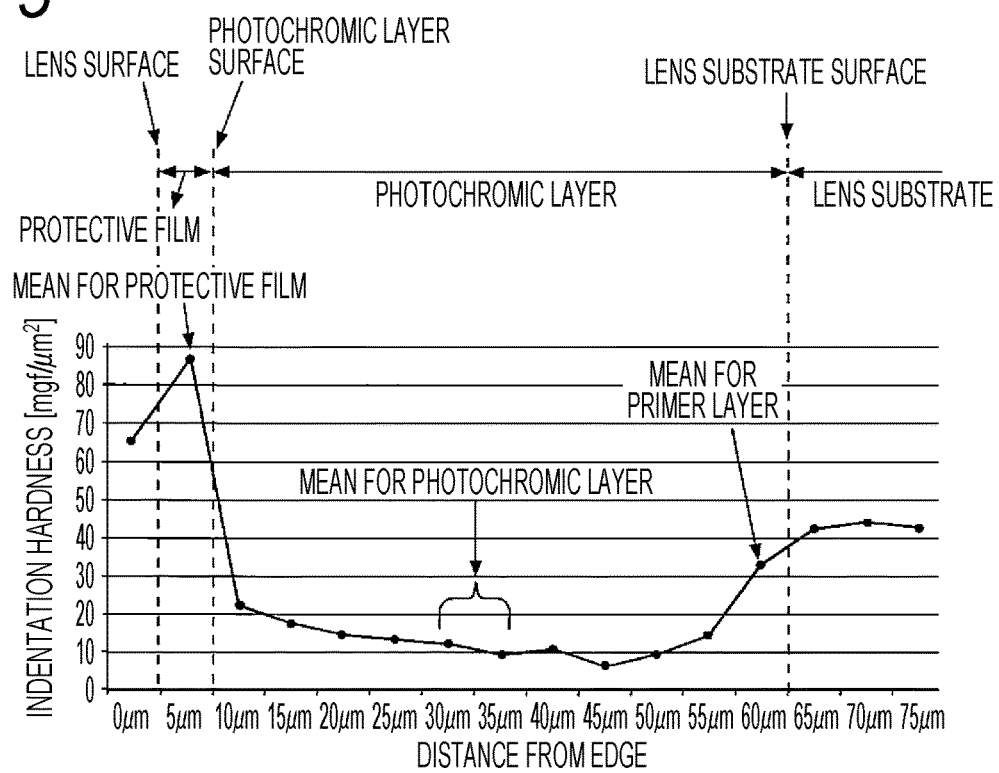
FIG. 5 shows an example profile of cross-section indentation hardness versus depth of a lens sample in the thickness direction.

FIG. 5 shows an example profile of cross-section hardness versus depth of a lens sample in the thickness direction. This profile indicates the profile in Example 1 described below.

5. Mean Cross-Section Hardness Definition

From the cross-section hardness profile created as described above, the mean cross-section hardness is calculated in the following manner depending on the number (N) of plot points in each layer.

For N=1, namely, the number of plot points in a layer is 1, the measured value is defined as the cross-section hardness of the layer.

For N=2, the mean of two points is defined as the mean cross-section hardness.

For N=3, the mean of three points is defined as the mean cross-section hardness.

For N>4 (even number), the mean of two points around the center is defined as the mean cross-section hardness.

For N>5 (odd number), the mean of three points including the median is defined as the mean cross-section hardness.

In the profile shown in FIG. 5, for example, for the photochromic layer, the mean of two points around the center is defined as the mean cross-section hardness. For the protective film, the number of plot points in the layer is 1, and the measured value is thus defined as the cross-section hardness.

In the present disclosure, the mean cross-section hardness is defined as the cross-section hardness of the layer.

6. Three-Dimensional Hardness Definition

In the present disclosure, for example, the value defined by the indentation hardness of the photochromic layer in the thickness direction × the thickness of the photochromic layer is used as an index of hardness, but an index of hardness can be defined by the mean cross-section hardness × the thickness. The value defined by the indentation hardness of each layer in the thickness direction × the thickness of the corresponding layer is also referred to as "three-dimensional hardness" for convenience of description. The three-dimensional hardness defined in this way means the hardness of the entire layer per unit area ($\mu m^2$).

In, for example, the profile shown in FIG. 5, the three-dimensional hardness of each layer (film) can be obtained from the data regarding the mean cross-section hardness and thickness of each layer (film). In a photochromic lens having the profile shown in FIG. 5, the photochromic layer has a mean cross-section hardness of 10.86 mgf/$\mu m^2$, a thickness of 45 μm, and a three-dimensional hardness of 488.7 mgf/μm. The protective film has a mean cross-section hardness of 85.24 mgf/$\mu m^2$, a thickness of 5.5 μm, and a three-dimensional hardness of 468.8 mgf/μm. The three-dimensional hardness ratio between the protective film and the photochromic layer (three-dimensional hardness of protective film/three-dimensional hardness of photochromic layer) is 0.96.

In the spectacle lens according to the present disclosure, it may be desired for the indentation hardness of the photochromic layer in the thickness direction to be less than or equal to the indentation hardness of the surface of the lens substrate. Specifically, it may be desired for the following formula to be satisfied.

Indentation hardness of photochromic layer in thickness direction ≤Indentation hardness of surface of lens substrate In the present disclosure, the photochromic layer is not harder than the lens substrate because the photochromic layer is soft.

The indentation hardness of the surface of the lens substrate can be expressed as the cross-section hardness of a surface layer of the lens substrate in contact with the photochromic layer.

In the spectacle lens according to the present disclosure including a protective film on the photochromic layer, it may be desired that the value (three-dimensional hardness) defined by the indentation hardness of the protective film in the thickness direction × the thickness of the protective film be 0.05 or more times and 1 or less times the value (three-dimensional hardness) defined by the indentation hardness of the photochromic layer in the thickness direction × the thickness of the photochromic layer. Specifically, it may be desired for the following formula to be satisfied.

0.05≤[three-dimensional hardness (indentation hardness × thickness) of protective film)/(three-dimensional hardness (indentation hardness × thickness) of photochromic layer)]≤1

The protective film includes, for example, a hard coat film and/or an anti-reflection film. The hard coat film and the anti-reflection film are described below in detail.

If the three-dimensional hardness ratio is more than 1, the photochromic layer may have low three-dimensional hardness and low adhesion, assuming that the three-dimensional hardness of the protective film is constant. If the three-dimensional hardness ratio is less than 0.05, the protective film may have low three-dimensional hardness and poor scratch resistance and may fail to function as a protective film, assuming that the three-dimensional hardness of the photochromic layer is constant.

The three-dimensional hardness in the present disclosure refers to the hardness of the entire layer per unit area ($\mu m^2$). When the three-dimensional hardness ratio (defined by using an index called three-dimensional hardness in consideration of the thickness of each layer) between the photochromic layer and the protective film is in the above range, the photochromic layer may have high optical responsivity, particularly high fading rate, and the lens may have high strength.

In the present disclosure, it may be further desired for the three-dimensional hardness ratio to be in the range of from 0.35 to 0.7.

In the present disclosure, it may be desired for the value (three-dimensional hardness) defined by the indentation hardness of the photochromic layer in the thickness direction × the thickness of the photochromic layer to be in the range of from 0.5 to 3200 mgf/$\mu$m.

When the three-dimensional hardness of the photochromic layer is in the above range, the photochromic layer may have both three-dimensional hardness and flexibility and may also have high optical responsivity, particularly high fading rate, while film strength necessary for a lens may be ensured.

It may be further desired for the three-dimensional hardness of the photochromic layer to be in the range of from 2 to 660 mgf/$\mu$m.

Regarding the photochromic lens according to the present disclosure, a protective film is not necessarily disposed on the photochromic layer. In this case, it may also be desired for the three-dimensional hardness of the photochromic layer to be in the above range.

In the present disclosure, it may be desired for the indentation hardness (cross-section hardness) of the photochromic layer in the thickness direction to be in the range of from 0.1 to 40 mgf/$\mu m^2$.

Having such an indentation hardness, the photochromic layer may have flexibility (softness) sufficient for the dye to easily move in the layer, so that the photochromic layer having photochromism may have high optical responsivity, particularly high fading rate.

In the present disclosure, it may be further desired for the indentation hardness (cross-section hardness) of the photochromic layer in the thickness direction to be in the range of from 0.1 to 11 mgf/$\mu m^2$.

In the present disclosure, it may be desired for the thickness of the photochromic layer to be in the range of from 5 $\mu$m to 80 $\mu$m. If the thickness of the photochromic layer is more than 80 $\mu$m, there may be a problem in which the film strength and the refractive index change and the transmittance is too low (density is too high). If the thickness of the photochromic layer is less than 5 $\mu$m, it may be difficult to ensure transmittance during coloration. It may be further desired for the thickness of the photochromic layer to be in the range of from 20 $\mu$m to 60 $\mu$m.

In the case where the protective film is disposed in the present disclosure, it may be desired for the indentation hardness (cross-section hardness) of the protective film in the thickness direction to be in the range of from 10 to 200 mgf/$\mu m^2$.

When the cross-section hardness of the protective film is in the above range, the entire layer including the photochromic layer and the protective film may have enough strength although the photochromic layer is soft.

In the present disclosure, it may be desired for the thickness of the protective film to be in the range of from 0.5 $\mu$m to 10 $\mu$m. If the thickness of the protective film is more than 10 $\mu$m, the refractive index changes, which affects lens optical properties. If the thickness of the protective film is less than 0.5 $\mu$m, the provision of the protective film on the photochromic layer may fail to ensure high strength, and the protective film thus may fail to function as a protective film. It may be further desired for the thickness of the protective film to be in the range of from 2.5 $\mu$m to 5 $\mu$m.

The characteristics of the spectacle lens (photochromic lens) according to the present disclosure regarding hardness (hardness) are as described above, and each element of the photochromic lens will be described below in detail.

[Photochromic Layer]

The photochromic layer can be formed by applying, onto a lens substrate, a photochromic layer coating liquid (photochromic layer-forming coating liquid) containing a photochromic dye and a curable component and subjecting the obtained coating film to a curing treatment.

The hardness (flexibility) of the photochromic layer can be controlled by controlling the cured state of the photochromic layer. The cured state of the photochromic layer can be controlled by, for example, the composition of the photochromic layer coating liquid, the curing treatment conditions, and the thickness of the photochromic layer. A description will be given one by one.

1. Photochromic Layer Coating Liquid

The photochromic layer coating liquid contains a curable component, a photochromic dye, a polymerization initiator, and other additives.

(1) Curable Component

Examples of the curable component that can be used to form the photochromic layer include, but are not limited to, known photopolymerizable monomers and oligomers having a radically polymerizable group, such as an (meth)acryloyl group, an (meth)acryloyloxy group, a vinyl group, an allyl group, a styryl group, and prepolymers of such monomers and oligomers. Among these, compounds having an (meth)acryloyl group or an (meth)acryloyloxy group as a radically polymerizable group may be desired in terms of availability and curability. The term (meth)acryloyl refers to both acryloyl and methacryloyl.

To prevent the photochromic layer and the lens substrate from being mixed with each other at the interface and to improve ease in hardness control, cured product properties, such as solvent resistance, hardness, and heat resistance, after film formation, or photochromic properties, such as color density and fading rate, it may be desired for the radically polymerizable monomer to be a combination of a homopolymer having a L-scale Rockwell hardness of 60 or more (hereinafter may also be referred to as a high hardness monomer) and a homopolymer having a L-scale Rockwell hardness of 40 or less (hereinafter may also be referred to as a low hardness monomer).

The term L-scale Rockwell hardness refers to the hardness measured in accordance with JIS-B7726.

The high hardness monomer has an effect of improving, for example, the solvent resistance, hardness, and heat resistance of a cured product after curing. Such a high hardness monomer is a compound having normally 2 to 15 radically polymerizable groups, preferably 2 to 6 radically polymerizable groups. Specific examples of suitable high hardness monomers include compounds represented by general formulas (1) to (5) below.

[Chemical formula 1]

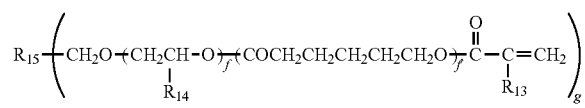

(1)

wherein $R_{13}$ is a hydrogen atom or a methyl group, $R_{14}$ is a hydrogen atom, a methyl group, or an ethyl group, $R_{15}$ is a trivalent to hexavalent organic group, f is an integer in the range of from 0 to 3, f' is an integer in the range of from 0 to 3, and g is an integer in the range of from 3 to 6.

[Chemical formula 2]

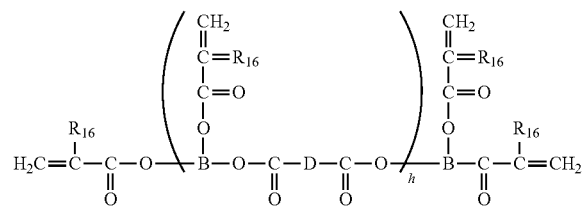

(2)

wherein $R_{15}$ is a hydrogen atom or a methyl group, B is a trivalent organic group, D is a divalent organic group, and h is an integer in the range of from 1 to 10.

[Chemical formula 3]

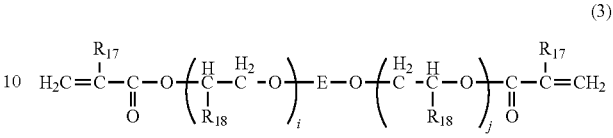

(3)

wherein $R_{17}$ is a hydrogen atom or a methyl group, $R_{18}$ is a hydrogen atom, a methyl group, an ethyl group, or a hydroxyl group, E is a divalent organic group containing a cyclic group, and i and j are positive integers with the mean of i+j being 0 to 6.

[Chemical formula 4]

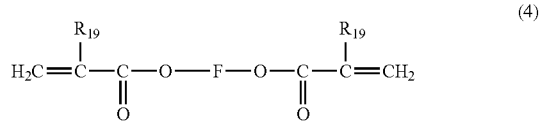

(4)

wherein $R_{19}$ is a hydrogen atom or a methyl group, and F is an alkylene group having 2 to 9 main-chain carbon atoms and optionally having a side chain.

[Chemical formula 5]

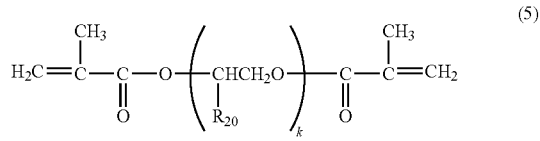

(5)

wherein $R_{20}$ is a hydrogen atom, a methyl group, or an ethyl group, and k is an integer in the range of from 1 to 6.

Since $R_{13}$ to $R^{19}$ in general formulas (1) to (4) above are each a hydrogen atom or a methyl group, the compounds represented by general formulas (1) to (4) are compounds having 2 to 6 (meth)acryloyloxy groups.

Specific examples of the high hardness monomer represented by general formula (1) above include trimethylolpropane trimethacrylate, trimethylolpropane triacrylate, tetramethylolmethane trimethacrylate, tetramethylolmethane triacrylate, trimethylolpropane trimethacrylate, tetramethylolmethane tetramethacrylate, tetramethylolmethane tetraacrylate, trimethylolpropane triethylene glycol trimethacrylate, trimethylolpropane triethylene glycol triacrylate, ethoxylated pentaerythritol tetraacrylate, ethoxylated pentaerythritol tetramethacrylate, pentaerythritol trimethacrylate, pentaerythritol tetramethacrylate, dipentaerythritol hexaacrylate, urethane oligomer tetraacrylate, urethane oligomer hexamethacrylate, urethane oligomer hexaacrylate, polyester oligomer hexaacrylate, caprolactone-modified dipentaerythritol hexaacrylate, and ditrimethylolpropane tetraacrylate.

Specific examples of the high hardness monomer represented by general formula (2) above include a tetrafunctional polyester oligomer with a molecular weight of 2,500 to 3,500 (e.g., EB80, Daicel UBC Co. Ltd.), a tetrafunctional polyester oligomer with a molecular weight of 6,000 to 8,000 (e.g., EB450, Daicel UBC Co. Ltd.), a hexafunctional polyester oligomer with a molecular weight of 45,000 to 55,000 (e.g., EB1830, Daicel UBC Co. Ltd.), and a tetrafunctional polyester oligomer with a molecular weight of 10,000 (e.g., GX8488B, DKS Co. Ltd.).

Specific examples of the high hardness monomer represented by general formula (3) above include Bisphenol A dimethacrylate, 2,2-bis(4-methacryloyloxyethoxyphenyl) propane, and 2,2-bis(3,5-dibromo-4-methacryloyloxy-ethoxyphenyl)propane.

Specific examples of the high hardness monomer represented by general formula (4) above include ethylene glycol diacrylate, ethylene glycol dimethacrylate, 1,4-butylene glycol dimethacrylate, 1,9-nonylene glycol dimethacrylate, neopentylene glycol dimethacrylate, and neopentylene glycol diacrylate.

Specific examples of the high hardness monomer represented by general formula (5) above include diethylene glycol dimethacrylate, triethylene glycol dimethacrylate, tetraethylene glycol dimethacrylate, tripropylene glycol dimethacrylate, and tetrapropylene glycol dimethacrylate.

There are also high hardness monomers other than those represented by the general formulas (1) to (5) above, and examples of typical compounds for other high hardness monomers include tricyclodecane dimethanol dimethacrylate, bisphenol A diglycidyl methacrylate, ethylene glycol bisglycidyl methacrylate, and glycidyl methacrylate.

The low hardness monomer has an effect of toughening a cured product and improving the fading rate of the photochromic compound.

Examples of the low hardness monomer include bifunctional monomers represented by general formula (6) and general formula (7) below and monofunctional monomers represented by general formula (8) and general formula (9) below.

[Chemical formula 6]

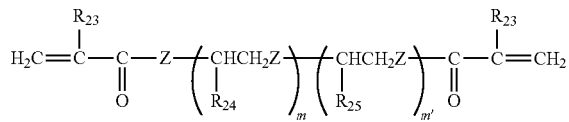

(6)

wherein $R_{23}$ is a hydrogen atom or a methyl group, $R_{24}$ and $R_{25}$ are each independently a hydrogen atom, a methyl group, or an ethyl group, Z is an oxygen atom or a sulfur atom, m is an integer from 1 to 70 when R23 is a hydrogen atom, or an integer from 7 to 70 when $R_{23}$ is a methyl group, and m' is an integer in the range of from 0 to 70.

[Chemical formula 7]

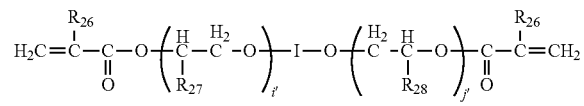

(7)

wherein $R_{26}$ is a hydrogen atom or a methyl group, $R_{27}$ and $R_{28}$ are each independently a hydrogen atom, a methyl group, an ethyl group, or a hydroxyl group, I is a divalent organic group containing a cyclic group, and i' and j' are integers with the mean of i'+j' being 8 to 40.

[Chemical formula 8]

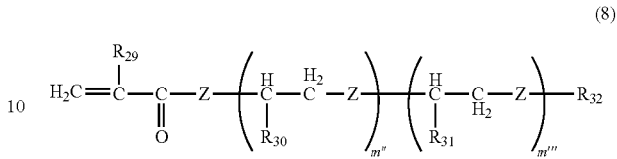

(8)

wherein $R_{29}$ is a hydrogen atom or a methyl group, $R_{30}$ and $R_{31}$ are each independently a hydrogen atom, a methyl group, or an ethyl group, $R_{32}$ is a hydrogen atom, an alkyl group, alkenyl group, alkoxyalkyl group, or haloalkyl group having 1 to 25 carbon atoms, an aryl group having 6 to 25 carbon atoms, or an acyl group other than (meth)acryloyl groups having 2 to 25 carbon atoms, Z is an oxygen atom or a sulfur atom, m" is an integer from 1 to 70 when R29 is a hydrogen atom, or an integer from 4 to 70 when R29 is a methyl group, and m''' is an integer in the range of from 0 to 70.

[Chemical formula 9]

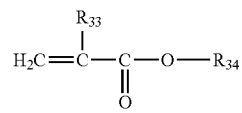

(9)

wherein $R_{33}$ is a hydrogen atom or a methyl group, and $R_{34}$ is an alkyl group having 1 to 20 carbon atoms when $R_{33}$ is a hydrogen atom, or an alkyl group having 8 to 40 carbon atoms when $R_{33}$ is a methyl group.

In the general formulas (6) to (9) above, $R_{23}$, $R_{26}$, $R_{29}$, and $R_{33}$ are each a hydrogen atom or a methyl group. In other words, the low hardness monomer normally has two or less (meth)acryloyloxy groups or (meth)acryloylthio groups as a polymerizable group.

Specific examples of the low hardness monomer represented by general formula (6) above include alkylene glycol di(meth)acrylates, such as trialkylene glycol diacrylate, tetraalkylene glycol diacrylate, nonylalkylene glycol diacrylate, and nonylalkylene glycol dimethacrylate.

Specific examples of the low hardness monomer represented by general formula (7) above include 2,2-bis(4-acryloyloxypolyethylene glycol phenyl)propane having an average molecular weight of 776.

Specific examples of the low hardness monomer represented by general formula (8) above include polyalkylene glycol (meth)acrylates, such as polyethylene glycol methacrylate having an average molecular weight of 526, polyethylene glycol methacrylate having an average molecular weight of 360, methyl ether polyethylene glycol methacrylate having an average molecular weight of 475, methyl ether polyethylene glycol methacrylate having an average molecular weight of 1,000, polypropylene glycol methacrylate having an average molecular weight of 375, polypropylene methacrylate having an average molecular weight of 430, polypropylene methacrylate having an average molecular weight of 622, methyl ether polypropylene glycol methacrylate having an average molecular weight of 620, polytetramethylene glycol methacrylate having an average molecular weight of 566, octylphenyl ether polyethylene glycol methacrylate having an average molecular weight of 2,034, nonylether polyethylene glycol methacrylate having an average molecular weight of 610, methyl ether polyethylene thioglycol methacrylate having an average molecular weight of 640, and perfluoroheptyl ethylene glycol methacrylate having an average molecular weight of 498. It may be desired for the average molecular weight of the low hardness monomer represented by general formula (8) to be in the range of from 200 to 2500, and it may be further desired for this average molecular weight to be in the range of from 300 to 700. The average molecular weight in the present disclosure is average molecular mass.

Specific examples of the low hardness monomer represented by general formula (9) above include stearyl methacrylate, lauryl methacrylate, ethylhexyl methacrylate, methyl acrylate, ethyl acrylate, butyl acrylate, and lauryl acrylate.

Among the low hardness monomers represented by general formulas (6) to (9), methyl ether polyethylene glycol methacrylate having an average molecular weight of 475, methyl ether polyethylene glycol methacrylate having an average molecular weight of 1,000, trialkylene glycol diacrylate, tetraalkylene glycol diacrylate, nonylalkylene glycol diacrylate, methyl acrylate, ethyl acrylate, butyl acrylate, and lauryl acrylate may be especially desired.

Examples of monomers other than the high hardness monomers and low hardness monomers described above, that is, homopolymers having a L-scale Rockwell hardness of more than 40 and less than 60 (may also be referred to as "medium hardness monomers") include bifunctional (meth) acrylates, such as polytetramethylene glycol dimethacrylate having an average molecular weight of 650, polytetramethylene glycol dimethacrylate having an average molecular weight of 1,400, and bis(2-methacryloyloxyethylthioethyl) sulfide; polyallyl compounds, such as diallyl phthalate, diallyl isophthalate, diallyl tartarate, diallyl epoxysuccinate, diallyl fumarate, diallyl chlorendate, diallyl hexaphthalate, and allyl diglycol carbonate; polythioacrylic and polythiomethacrylic acid ester compounds, such as 1,2-bis(methacryloylthio)ethane, bis(2-acryloylthioethyl)ether, and 1,4-bis(methacryloylthiomethyl)benzene; unsaturated carboxylic acids, such as acrylic acid, methacrylic acid, and maleic anhydride; acrylic and methacrylic acid ester compounds, such as methyl methacrylate, butyl methacrylate, benzyl methacrylate, phenyl methacrylate, 2-hydroxyethyl methacrylate, and biphenyl methacrylate; fumaric acid ester compounds, such as diethyl fumarate and diphenyl fumarate; thioacrylic and thiomethacrylic acid ester compounds, such as methyl thioacrylate, benzyl thioacrylate, and benzyl thiomethacrylate; vinyl compounds, such as styrene, chlorostyrene, methylstyrene, vinylnaphthalene, α-methylstyrene dimmer, bromostyrene, divinylbenzene, and vinylpyrrolidone; and radically polymerizable monofunctional monomers, such as (meth)acrylates whose hydrocarbon chain having an unsaturated bond in the molecule has 6 to 25 carbon atoms, for example, oleyl methacrylate, nerol methacrylate, geraniol methacrylate, linalool methacrylate, and farnesol methacrylate.

These medium hardness monomers can be appropriately mixed with the high hardness monomers and low hardness monomers described above before use. To achieve a better balance in cured product properties, such as solvent resistance, hardness, and heat resistance of a cured product, or photochromic properties, such as color density and fading rate, it may be desired for the low hardness monomer and the high hardness monomer to be 5 to 70 mass % and 5 to 95 mass % respectively relative to all radically polymerizable monomers.

In addition to the above components, it may be desired for a radically polymerizable monomer having at least an epoxy group and a radically polymerizable group in the molecule to be contained as a curable component. Examples of the radically polymerizable monomer include glycidyl acrylate, glycidyl methacrylate, and glycidyloxy polyethylene glycol methacrylate.

(2) Photochromic Dye

The photochromic dye may be any one of known photochromic dyes. Examples of known photochromic dyes include photochromic compounds, such as fulgimide compounds, spirooxazine compounds, and chromene compounds. In the present disclosure, these photochromic compounds can be used without any limitation.

Examples of the fulgimide compounds, spirooxazine compounds, and chromene compounds that can be preferably used include compounds described in, for example, JP 2-28154 A, JP 62-288830 A, WO 94/22850 A, and WO 96/14596 A.

Examples of compounds having good photochromism that can be preferably used include compounds disclosed in, for example, JP 2001-114775 A, JP 2001-031670 A, JP 2001-011067 A, JP 2001-011066 A, JP 2000-347346 A, JP 2000-34476 A, JP 2000-3044761 A, JP 2000-327676 A, JP 2000-327675 A, JP 2000-256347 A, JP 2000-229976 A, JP 2000-229975 A, JP 2000-229974 A, JP 2000-229973 A, JP 2000-229972 A, JP 2000-219687 A, JP 2000-219686 A, JP 2000-219685 A, JP 11-322739 A, JP 11-286484 A, JP 11-279171 A, JP 10-298176 A, JP 09-218301 A, JP 09-124645 A, JP 08-295690 A, JP 08-176139 A, and JP 08-157467 A. These publications are incorporated herein by reference in their entirety.

Among these photochromic compounds, it may be desired to use chromene photochromic compounds since they have good photochromic properties, such as color density and fading rate.

Suitable examples of chromene compounds excellent in various photochromic properties, such as color density, fading rate, and durability include compounds represented by general formula (10) below.

[Chemical formula 10]

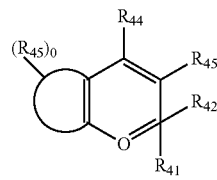

(10)

wherein the group represented by general formula (11) below is a substituted or non-substituted aromatic hydrocarbon group or a substituted or non-substituted unsaturated heterocyclic group:

[Chemical formula 11]

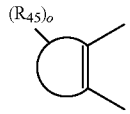
(11)

$R_{43}$, $R_{44}$, and $R_{45}$ are each independently a hydrogen atom, an alkyl group, an alkoxy group, an aralkoxy group, an amino group, a substituted amino group, a cyano group, a substituted or non-substituted aryl group, a halogen atom, an aralkyl group, a hydroxyl group, a substituted or non-substituted alkynyl group, a substituted or non-substituted heterocyclic group that has a nitrogen atom as a heteroatom and in which the nitrogen atom is bonded to a pyran ring or a ring of a group represented by general formula (13) below, or a condensed heterocyclic group in which an aromatic hydrocarbon ring or aromatic heterocyclic ring is condensed with the heterocyclic group, and o is an integer in the range of from 0 to 6.

Furthermore, $R_{41}$ and $R_{42}$ are each independently a group represented by general formula (12) below:

[Chemical formula 12]

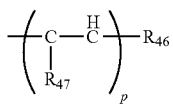
(12)

(wherein $R_{46}$ is a substituted or non-substituted aryl group, or a substituted or non-substituted heteroaryl group, and $R_{47}$ is a hydrogen atom, an alkyl group, or a halogen atom, and p is an integer from 1 to 3), a group represented by general formula (13) below:

[Chemical formula 13]

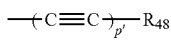
(13)

(wherein $R_{48}$ is a substituted or non-substituted aryl group, or a substituted or non-substituted heteroaryl group, and p' is an integer from 1 to 3), a substituted or non-substituted aryl group, a substituted or non-substituted heteroaryl group, or an alkyl group, or $R_{41}$ and $R_{42}$ together may form an aliphatic hydrocarbon ring or an aromatic hydrocarbon ring.

Examples of substituents in the substituted aryl group and the heteroaryl group described for general formulas (12) and (13) above and $R_{41}$ and $R_{42}$ include the same groups as for $R_{43}$ and $R_{44}$.

Among the chromene compounds represented by general formula (10) above, compounds represented by general formulas (14) to (19) below may be especially desired in terms of photochromic properties, such as color density and fading rate.

[Chemical formula 14]

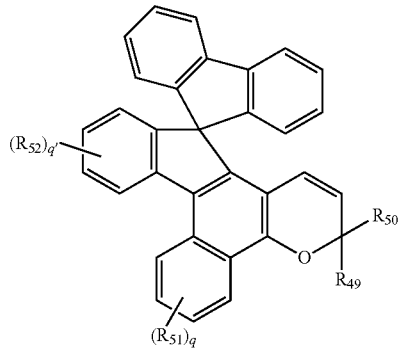
(14)

wherein $R_{49}$ and $R_{50}$ are the same as $R_{41}$ and $R_{42}$ in general formula (10) above, respectively, $R_{51}$ and $R_{52}$ are each the same as $R_{45}$ in general formula (10) above, and q and q' are each 1 or 2.

[Chemical formula 15]

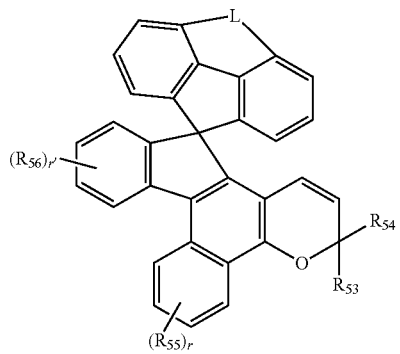
(15)

wherein $R_{53}$ and $R_{54}$ are the same as $R_{41}$ and $R_{42}$ in general formula (10) above, respectively, $R_{55}$ and $R_{56}$ are each the same as $R_{45}$ in general formula (10) above, and L is a group represented by the following formula:

[Chemical formula 16]

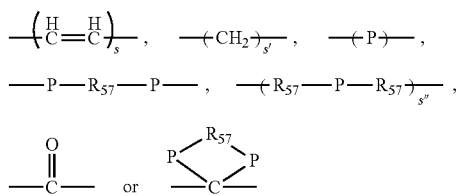

(wherein P is an oxygen atom or a sulfur atom, $R_{57}$ is an alkylene group having 1 to 6 carbon atoms, and s, s', and s" are each an integer from 1 to 4), and r and r' are each 1 or 2.

[Chemical formula 17]

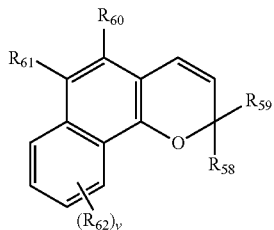
(16)

wherein $R_{58}$ and $R_{59}$ are the same as $R_{41}$ and $R_{42}$ in formula (10) above, respectively, $R_{60}$, $R_{61}$, and $R_{62}$ are each the same as $R_{45}$ in formula (10) above, and v is 1 or 2.

[Chemical formula 18]

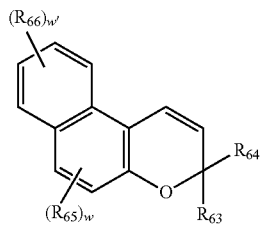
(17)

wherein $R_{63}$ and $R_{64}$ are the same as $R_{41}$ and $R_{42}$ in formula (10) above, respectively, $R_{65}$ and $R_{66}$ are each the same as $R_{45}$ in formula (10) above, and w and w' are each 1 or 2.

[Chemical formula 19]

(18)

wherein $R_{67}$ and $R_{68}$ are the same as $R_{41}$ and $R_{42}$ in formula (10) above, respectively, $R_{69}$, $R_{70}$, $R_{71}$, and $R_{72}$ are each the same as $R_{45}$ in formula (10) above, and x and x' are each 1 or 2.

[Chemical formula 20]

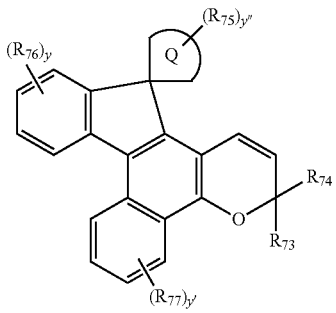
(19)

wherein $R_{73}$ and $R_{74}$ are the same as $R_{41}$ and $R_{42}$ in formula (10) above, respectively, and $R_{75}$, $R_{76}$, and $R_{77}$ are each the same as $R_{45}$ in formula (10) above,

[Chemical formula 21]

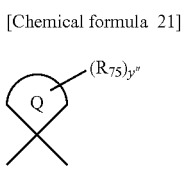

is an aliphatic hydrocarbon ring optionally having at least one substituent, and y, y', and y" are each 1 or 2.

Among the chromene compounds represented by general formulas (14) to (19) above, chromene compounds (exemplary compounds (A) to (F)) having the following structures may be especially desired.

[Chemical formula 22]

[Exemplary Compounds]

(A)

(B)

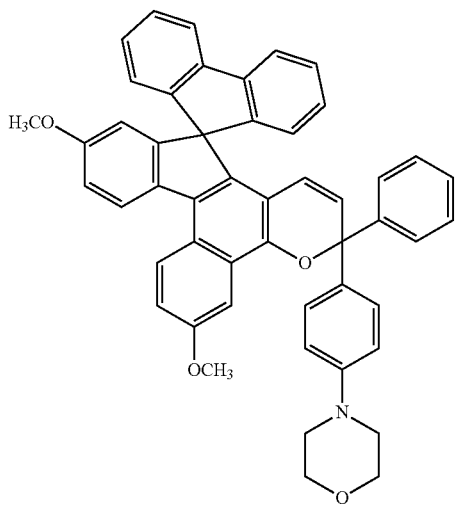

(C)

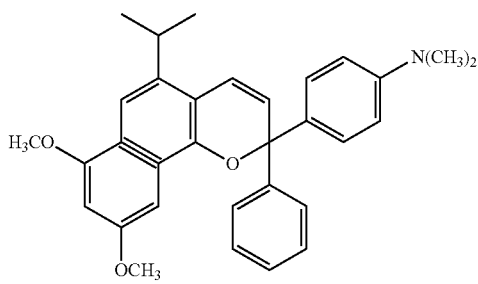

(D)

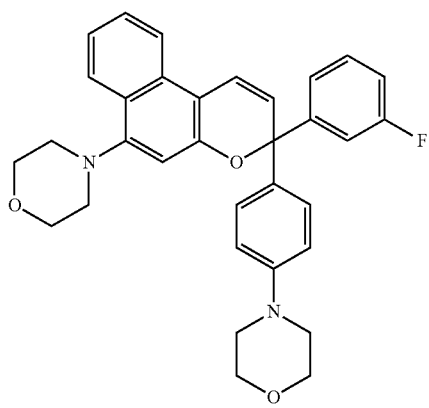

(E)

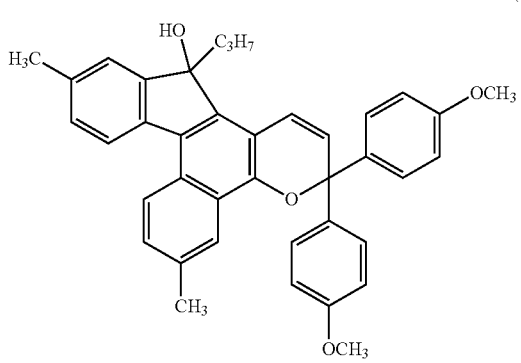

(F)

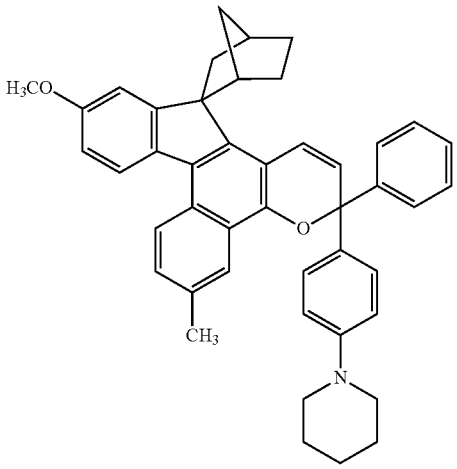

These photochromic compounds can be appropriately mixed and used in order to express suitable color tone.

(3) Polymerization Initiator

The polymerization initiator to be added to the photochromic layer coating liquid can be appropriately selected for use from known photopolymerization initiators or known thermal polymerization initiators depending on polymerization method. Examples of photopolymerization initiators include benzoin, benzoin butyl ether, benzoin methyl ether, benzophenol, acetophenone, 4,4-dichlorobenzophenone, diethoxyacetophenone, 2-hydroxy-2-methyl-1-phenylpropan-1-one, 1-hydroxycyclohexyl phenyl ketone, and bis(2,4,6-trimethylbenzoyl)-phenyl phosphine oxide. Examples of thermal polymerization initiators include diacyl peroxides, such as benzoyl peroxide and p-chlorobenzoyl peroxide; percarbonates, such as t-butylperoxy-2-ethylhexanoate and t-butylperoxy dicarbonate; and azo compounds, such as 2,2-azobis isobutyronitrile.

(4) Other Additives

To improve the durability, coloring rate, and fading rate of the photochromic dye and to improve formability, the photochromic layer coating liquid may further contain additives appropriately selected from surfactants, antioxidants, radical scavengers, ultraviolet stabilizers, ultraviolet absorbers, anti-coloring agents, antistatic agents, fluorescent dyes, pigments, flavors, and plasticizers. These additives may be any known compounds. Examples of suitable additives include hindered amine light stabilizers, hindered phenol antioxidants, phenol radical scavengers, sulfur antioxidants, benzotriazole compounds, and benzophenone compounds.

2. Curing Treatment Conditions

The control of the cured state of the photochromic layer can provide a photochromic layer containing an uncured curable component and a cured resin formed by curing a curable component. The cured state of the photochromic layer can be controlled by the curing treatment conditions, for example, photoirradiation conditions, for the curable component. Specifically, it may be desired for the light source wavelength and the photoirradiation dose (e.g., irradiation energy, irradiation time) to be controlled appropriately.

3. Thickness of Photochromic Layer

The cured state of the photochromic layer can also be controlled by the thickness of the photochromic layer. If the photochromic layer is too thin, the entire layer undergoes polymerization, and it may thus be difficult to impart appropriate flexibility to the photochromic layer. In addition, the dye is unlikely to move, and it may thus be difficult to improve photochromic performance. The three-dimensional hardness of the photochromic layer can be controlled by the thickness of the photochromic layer. In terms of the foregoing points, it may be desired for the thickness of the photochromic layer to be in the range of from 5 to 80 μm, and it may be particularly desired for the thickness of the photochromic layer to be in the range of from 20 to 60 μm.

For the purpose of improving the adhesion of the photochromic layer to the lens substrate, a primer layer may be disposed between the lens substrate and the photochromic layer. The primer layer is normally made of urethane-based resin or the like although the material of the primer layer depends on the materials of the lens substrate and the photochromic layer.

[Lens Substrate]

The lens substrate in the spectacle lens (photochromic lens) according to the present disclosure may be any one of various substrates normally used as plastic lenses. The lens substrate can be produced by charging a lens monomer into a lens forming mold and subjecting the lens monomer to a curing treatment.

The lens monomer is not limited and may be any one of various monomers normally used to produce plastic lenses. Examples of the lens monomer include monomers having, in their molecules, a benzene ring, a naphthalene ring, an ester bond, a carbonate bond, or an urethane bond. In addition, compounds containing sulfur or a halogen element can also be used. In particular, compounds having a nucleus halogen-substituted aromatic ring can also be used. The lens monomer can be produced by using one or two or more of monomers having the above functional groups. Examples of the lens monomer include styrene, divinylbenzene, phenyl (meth)acrylate, benzyl (meth)acrylate, naphthyl (meth)acrylate, methyl (meth)acrylate, diethylene glycol bis(allyl carbonate), diallyl (iso)phthalate, dibenzyl itaconate, dibenzyl fumarate, chlorostyrene, nucleus halogen-substituted styrene, nucleus halogen-substituted phenyl (meth)acrylate, nucleus halogen-substituted benzyl (meth)acrylate, (di)(meth)acrylates of tetrabromobisphenol-A derivatives, diallyl carbonates of tetrabromobisphenol-A derivatives, diorthochlorobenzyl itaconate, diorthochlorobenzyl fumarate, diethylene glycol bis(orthochlorobenzyl) fumarate, (di)ethylene glycol di(meth)acrylate, glycidyl methacrylate, reaction products of polyfunctional isocyanates, such as xylylene diisocyanate and hexamethylene diisocyanate, reaction products between monohydroxy acrylates of nucleus halogen-substituted phenol derivatives and polyfunctional isocyanates, reaction products between monohydroxy acrylates of nucleus halogen-substituted biphenyl derivatives and polyfunctional isocyanates, reaction products between xylene diisocyanate and polyfunctional mercaptans, reaction products between glycidyl methacrylate and polyfunctional methacrylates, and mixtures thereof.

The lens substrate may be a lens substrate with power or a lens substrate without power. In other words, it should be understood that the present disclosure may be applied to a spectacle lens with power that corrects eye refractive error and a spectacle lens without power, such as sunglasses.

[Protective Film]

The spectacle lens (photochromic lens) according to the present disclosure may further include a protective film such as a hard coat film or an anti-reflection film for the purpose of, for example, impact resistance, abrasion resistance, and anti-reflection.

The hard coat film can be provided for the purpose of imparting impact resistance and abrasion resistance to a plastic lens. Since an anti-reflection film normally has poor adhesion to a plastic lens, the hard coat film is disposed between the plastic lens and the anti-reflection film to improve the adhesion of the anti-reflection film and prevent peeling.

A typical method for forming the hard coat film involves applying a curable composition to the surface of the plastic lens by spin coating or the like and curing the obtained coating film. The curing treatment can be performed through, for example, heating or photoirradiation depending on the type of curable composition. Examples of the curable composition include a photocurable silicone composition containing, as main components, a silicone compound that generates a silanol group upon ultraviolet irradiation and an organopolysiloxane that has a reactive group, such as a halogen atom or an amino group, and undergoes a condensation reaction with the silanol group; an acrylic ultraviolet curable monomer composition; and an inorganic fine particle-containing thermosetting composition obtained by dispersing inorganic fine particles made of $SiO_2$, $TiO_2$, or the like in a silane compound or silane coupling agent having a polymerizable group, such as vinyl group, allyl group, acrylic group, or methacryl group, and a hydrolyzable group, such as methoxy group.

The anti-reflection film includes a single layer or multiple layers including an inorganic coating and/or an organic coating. Examples of the material of the inorganic coating include inorganic substances, such as $SiO_2$, $SiO$, $ZrO_2$, $TiO_2$, $TiO$, $Ti_2O_3$, $Ti_2O_5$, $Al_2O_3$, $Ta_2O_5$, $CeO_2$, $MgO$, $Y_2O_3$, $SnO_2$, $MgF_2$, and $WO_3$. These inorganic substances can be used singly or in combination of two or more. For plastic lenses, $SiO_2$, $ZrO_2$, $TiO_2$, and $Ta_2O_5$, which can be deposited in vacuum at low temperature, may be desired. When the anti-reflection layer has a multilayer structure, it may be desired for the outermost layer to be made of $SiO_2$.

The inorganic coating can be formed by, for example, vacuum deposition, ion plating, sputtering, CVD, or deposition through chemical reactions in a saturated solution.

The above description mainly focuses on application of the optical article according to the present disclosure to the structure of a spectacle lens (with power, without power). The present disclosure is not limited to this embodiment. For example, the structure of the present disclosure can also be applied to a goggle lens for a goggle that has one lens to cover the eyes instead of two (left and right) lens, which are included in a typical structure. The structure of the present disclosure can also be applied to the structure of a member corresponding to a visor (brim) portion, which is different from a lens shape of a typical spectacle lens, in the case where the visor (brim) portion has photochromism. The structure of the present disclosure can also be applied to the structure of a helmet shield member. The member corresponding to a visor portion or the shield member includes a plastic substrate, such as polycarbonate.

EXAMPLES

Hereinafter, the present disclosure will be described in more detail by way of Examples.

Example 1

(1) Lens Substrate

A lens, trade name EYAS (center thickness 2.0 mm, radius 75 mm, S-4.00) available from HOYA Corporation, was used as a plastic lens substrate. The lens substrate was immersed in a 10 mass % aqueous solution of sodium hydroxide at 60° C. for 5 minutes, washed well with pure water, and dried.

(2) Formation of Primer Layer

An aqueous polyurethane resin liquid (polycarbonate polyol-based polyurethane emulsion, viscosity 100 CPS, solid content 38%) was used as a primer coating liquid.

The primer coating liquid was deposited, by spin coating, on the convex surface of the lens substrate prepared in (1). The coating was then naturally dried in an atmosphere of 25° C. and 50% RH for 15 minutes to form a primer layer. The thickness of the primer layer was 5.5 µm.

(3) Preparation of Photochromic Layer Coating Liquid

In a plastic container, a radically polymerizable composition containing 20 parts by mass of trimethylolpropane trimethacrylate, 35 parts by mass of BPE oligomer (2,2-bis (4-methacryloyloxypolyethoxyphenyl)propane), 10 parts by mass of EB6A (polyester oligomer hexaacrylate), 10 parts by mass of polyethylene glycol diacrylate having an average molecular weight of 532, and 10 parts by mass of glycidyl methacrylate was prepared. To 100 parts by mass of the radically polymerizable composition, 3 parts by mass of the exemplary chromene compound (A), serving as a photochromic dye, 5 parts by mass of light stabilizers LS765 (bis(1,2,2,6,6-pentamethyl-4-piperidyl)sebacate and methyl (1,2,2,6,6-pentamethyl-4-piperidyl)sebacate), 5 parts by mass of hindered phenolic antioxidant (Irgacure 245 available from Ciba Specialty Chemicals), and 0.6 parts by mass of CGI-1870 (available from Ciba Specialty Chemicals), serving as an ultraviolet polymerization initiator, were added and mixed well under stirring to provide a composition. To the composition, 6 parts by mass of γ-methacryloyloxypropyltrimethoxysilane (KBM503 available from Shin-Etsu Chemical Co., Ltd.) was added dropwise under stirring. The resulting mixture was then defoamed in a planetary stirring defoaming apparatus for 2 minutes to provide a curable composition having photochromism.

(4) Formation of Photochromic Layer

The curable composition prepared in (3) above was applied onto the primer layer on the lens substrate by spin coating. Spin coating was performed by using the method described in JP 2005-218994 A (a method using a coating apparatus including a spin holder that holds a lens material and a dispenser that supplies a coating liquid).

The resulting lens was then irradiated with Fusion UV lamp (D bulb) at a cumulative ultraviolet dose (wavelength: 405 nm) of 2.2 J/cm$^2$ (220 mW/cm$^2$, 60 seconds) in a nitrogen atmosphere (oxygen concentration: 500 ppm or less) to form a photochromic layer. The thickness of the photochromic layer was 45 µm.

(5) Preparation of Hard Coating Liquid

In an atmosphere of 5° C., 45 parts by mass of modified stannic oxide-zirconium oxide-tungsten oxide-silicon oxide composite methanol sol, 15 parts by mass of γ-glycidoxypropyl trimethoxysilane, and 3 parts by mass of tetraethoxysilane were mixed and stirred for one hour. Subsequently, 4.5 parts by mass of 0.001 mol/L hydrochloric acid were added, and the obtained mixture was stirred for 50 hours. Thereafter, 25 parts by mass of propylene glycol monomethyl ether (PGM) and 9 parts by mass of diacetone alcohol (DAA), serving as solvents, 1.8 parts by mass of aluminum tris(acetyl acetate) (AL-AA), serving as component (C), and 0.05 parts by mass of aluminum perchlorate were sequentially added, and the obtained mixture was stirred for 150 hours. The obtained solution was filtered through a 0.5-µm filter, and the filtrate was used as a coating composition.

(6) Formation of Hard Coat Film

The plastic lens formed in (4) above was immersed in a 10 mass % aqueous solution of sodium hydroxide at 60° C. for 5 minutes, washed well with pure water, and dried. Subsequently, the hard coating composition prepared in (5) above was applied to the resulting lens by means of dipping (pulling rate: 20 cm/min) and thermally cured at 100° C. for 60 minutes to form a hard coat film having a thickness of 5 µm.

(7) Formation of Anti-Reflection Film

The plastic lens having the hard coat film formed in (6) above was placed in a vapor deposition apparatus and heated to 85° C. under evacuation. The vapor deposition apparatus was evacuated to 2.7 mPa (2×10$^{-5}$ torr). Vapor deposition materials were then deposited on the plastic lens by electron beam heating to form a base layer made of $SiO_2$ and having a thickness of 0.6λ and, on the base layer, a first reflective layer including a mixture layer (nd=2.05, nλ=0.075λ) made of $Ta_2O_5$, $ZrO_2$, and $Y_2O_3$ and a $SiO_2$ layer (nd=1.46, nλ=0.056λ) and a second reflective layer (nd=1.46, nλ=0.25λ) including a mixture layer (nd=2.05, nλ=0.075λ) made of $Ta_2O_5$, $ZrO_2$, and $Y_2O_3$ and a $SiO_2$ layer. As a result, an anti-reflection film having a thickness of 0.5 µm was formed.

A photochromic lens including, in this order, the photochromic layer and the protective film including the hard coat film and the anti-reflection film on the convex surface of the lens substrate was provided through the above process.

Example 2

A photochromic lens was produced in the same manner as in Example 1 except that no hard coat film was formed (the hard coat film was omitted) in Example 1.

Example 3

A photochromic lens was produced in the same manner as in Example 1 except that no primer layer was formed (the primer layer was omitted) in Example 1.

Comparative Example 1

A photochromic lens was produced by forming, for example, a photochromic layer and a protective film by the same method as in Example 1 except that the ultraviolet irradiation time was 10 seconds in the photochromic layer-forming step in Example 1.

For the photochromic lenses of Examples and Comparative Examples produced as described above, the indentation hardness (cross-section hardness) of the photochromic layer in the thickness direction and the ratio (three-dimensional hardness ratio between the photochromic layer and the protective film) of the value (three-dimensional hardness) defined by the indentation hardness of the protective layer in the thickness direction × the thickness of the protective layer to the value (three-dimensional hardness) defined by the indentation hardness of the photochromic layer in the thickness direction × the thickness of the photochromic layer were measured by the measurement methods described above with reference to FIG. 2 to FIG. 4. The cross-section hardness of the surface of the lens substrate was 45 mgf/µm$^2$. The hardness profile in Example 1 above is shown in FIG. 5.

The photochromic performance (fading rate) of the photochromic lenses of Examples and Comparative Examples produced as described above was evaluated in the following manner.

[Photochromic Performance Evaluation]

<Fading Rate>

The photochromism was evaluated by the following method in accordance with JIS T7333.

The surface (the surface opposite to the surface facing the lens substrate) of the photochromic layer in each of the photochromic lenses produced in Examples and Comparative Examples was subjected to photoirradiation from a xenon lamp through an air mass filter for 15 minutes (900 seconds) so that the photochromic layer developed color. Regarding the color density at this time, the transmittance at 550 nm was measured with a spectrophotometer available from Otsuka Electronics Co., Ltd. The above photoirradiation was performed such that the irradiance and the irradiance tolerance were values shown in Table 1 below as specified in JIS T7333. The fading rate was obtained by performing photoirradiation for 15 minutes (900 seconds) as described above and measuring changes in transmittance (550 nm) from the time at which the irradiation was stopped. The higher the fading rate, that is, the shorter the time until (the higher the rate at which) the transmittance returns back to its original value, the better the photochromism.

TABLE 1

| Wavelength Range (nm) | Irradiance (W/m$^2$) | Irradiance Tolerance (W/m$^2$) |
| --- | --- | --- |
| 300 to 340 | <2.5 | — |
| 340 to 380 | 5.6 | ±1.5 |
| 380 to 420 | 12 | ±3.0 |
| 420 to 460 | 12 | ±3.0 |
| 460 to 500 | 26 | ±2.6 |

The photochromic lenses of Examples and Comparative Examples produced as described above were subjected to the following scratch resistance test and adhesion test to evaluate strength and the like.

[Scratch Resistance Test]

The surface of each photochromic lens was rubbed with steel wool (grade #0000 available from NIHON STEEL WOOL Co., Ltd.) at a pressure of 1 kgf/cm$^2$, and the scratch resistance was visually determined. The evaluation criteria are as described below.

UA: almost no scratch

A: several light scratches, or about two deep but thin scratches

B: about 20 light scratches, or about 10 thin but deep scratches

C: many deep (any thickness) scratches and nearly cloudy state, or light scratches but no coating (weak film)

[Adhesion Test (Cross Hatch Test)]

The surface of the photochromic lens was cross-cut to obtain a pattern of 100 squares at 1 mm intervals. A commercial adhesive tape was strongly attached to the surface and rapidly peeled directly upward to determine whether the cured coating was peeled.

The adhesion when the cured coating was not peeled was expressed as 100/100, and the adhesion when the cured coating was completely peeled was expressed as 0/100.

The above evaluation results are summarized below in Table 2.

TABLE 2

| | Cross-Section Hardness (mgf/μm$^2$) of Photochromic Layer | Three-Dimensional Hardness Ratio Between Photochromic Layer and Protective Film | Fading Rate (sec) | Scratch Resistance | Adhesion |
| --- | --- | --- | --- | --- | --- |
| Example 1 | 10.86 | 0.70 | 220 | UA | 100/100 |
| Example 2 (no hard coat) | 10.52 | 0.064 | 218 | UA | 100/100 |
| Example 3 (no primer) | 10.25 | 0.96 | 219 | A | 90/100 |
| Comparative Example 1 | 3.35 | 1.40 | 105 | C | 0/100 |

The results in Table 2 above indicate that, when the cross-section hardness of the photochromic layer is smaller than the cross-section hardness of the surface of the lens substrate, and the three-dimensional hardness ratio between the photochromic layer and the protective film is in the range of the present disclosure, photochromic lenses (spectacle lenses) that have high strength and in which the photochromic layer having photochromism has high optical responsivity, particularly high fading rate, can be provided. However, if the photochromic layer is too soft because of a short ultraviolet irradiation time, and the three-dimensional hardness ratio between the photochromic layer and the protective film is out of the range of the present disclosure as in Comparative Example 1, the scratch resistance and the adhesion are significantly poor. As a result, the photochromic layer in Comparative Example 1 fails to achieve both high lens strength and high fading rate of the photochromic layer at the same time.

REFERENCE SIGNS LIST

10 Lens substrate
20 Photochromic layer
30 Protective film
40 Sample stage
50 Test sample
100 Photochromic lens (spectacle lens)

The invention claimed is:

1. An optical article comprising:
   a substrate;
   a protective film on the substrate; and
   a photochromic layer between the substrate and the protective film, the photochromic layer containing a photochromic dye and a resin component,
   wherein an indentation hardness of the photochromic layer in a thickness direction is less than or equal to an indentation hardness of a surface of the substrate,
   wherein a result of multiplying the indentation hardness of the photochromic layer in the thickness direction and a thickness of the photochromic layer is from one to twenty times a result of multiplying an indentation hardness of the protective film in a thickness direction and a thickness of the protective film, and
   wherein the indentation hardness in the thickness direction is a cross-section hardness measured on a cross section sliced from the optical article.

2. The optical article according to claim 1, wherein the result of multiplying the indentation hardness of the photochromic layer in the thickness direction and the thickness of the photochromic layer is in a range of from 0.5 to 3200 mgf/μm.

3. The optical article according to claim 1, wherein the indentation hardness of the photochromic layer in the thickness direction is in a range of from 0.1 to 40 mgf/μm$^2$.

4. The optical article according to claim 3, wherein the thickness of the photochromic layer is in a range of from 5 μm to 80 μm.

5. The optical article according to claim 4, wherein the resin component in the photochromic layer includes an uncured curable component and a cured resin formed by curing an ultraviolet curable component.

6. The optical article according to claim 5, wherein the curable component includes a high hardness monomer and a low hardness monomer.

7. The optical article according to claim 4, wherein the optical article is a spectacle lens with power or a spectacle lens without power.

8. The optical article according to claim 1, wherein the thickness of the photochromic layer is in a range of from 5 μm to 80 μm.

9. The optical article according to claim 1, wherein the protective film includes at least one of a hard coat film or an anti-reflection film.

10. The optical article according to claim 9, wherein the indentation hardness of the protective film in the thickness direction is in a range of from 10 to 200 mgf/μm$^2$.

11. The optical article according to claim 10, wherein the resin component in the photochromic layer includes an uncured curable component and a cured resin formed by curing an ultraviolet curable component.

12. The optical article according to claim 1, wherein the indentation hardness of the protective film in the thickness direction is in a range of from 10 to 200 mgf/μm$^2$.

13. The optical article according to claim 1, wherein the thickness of the protective film is in a range of from 0.5 μm to 10 μm.

14. The optical article according to claim 1, wherein the resin component in the photochromic layer includes an uncured curable component and a cured resin formed by curing an ultraviolet curable component.

15. The optical article according to claim 14, wherein the curable component includes a high hardness monomer and a low hardness monomer.

16. The optical article according to claim 1, wherein the optical article is a spectacle lens with power or a spectacle lens without power.

17. The optical article according to claim 1, wherein the optical article is a goggle lens.

18. The optical article according to claim 1, wherein the optical article is a brim portion of a sun visor.

19. The optical article according to claim 1, wherein the optical article is a shield member of a helmet.

20. A method of manufacturing an optical article, the method comprising:
    forming, on a substrate, a photochromic layer containing a photochromic dye and a resin component; and
    forming, on the photochromic layer, a protective film,
    wherein an indentation hardness of the photochromic layer in a thickness direction is less than or equal to an indentation hardness of a surface of the substrate, and
    wherein a result of multiplying the indentation hardness of the photochromic layer in the thickness direction and a thickness of the photochromic layer is from one to twenty times a result of multiplying an indentation hardness of the protective film in a thickness direction and a thickness of the protective film.

* * * * *